April 20, 1926. 1,581,717
R. BOWEN
FILLER CAP AND LIQUID DEPTH GAUGE
Filed Dec. 3, 1924
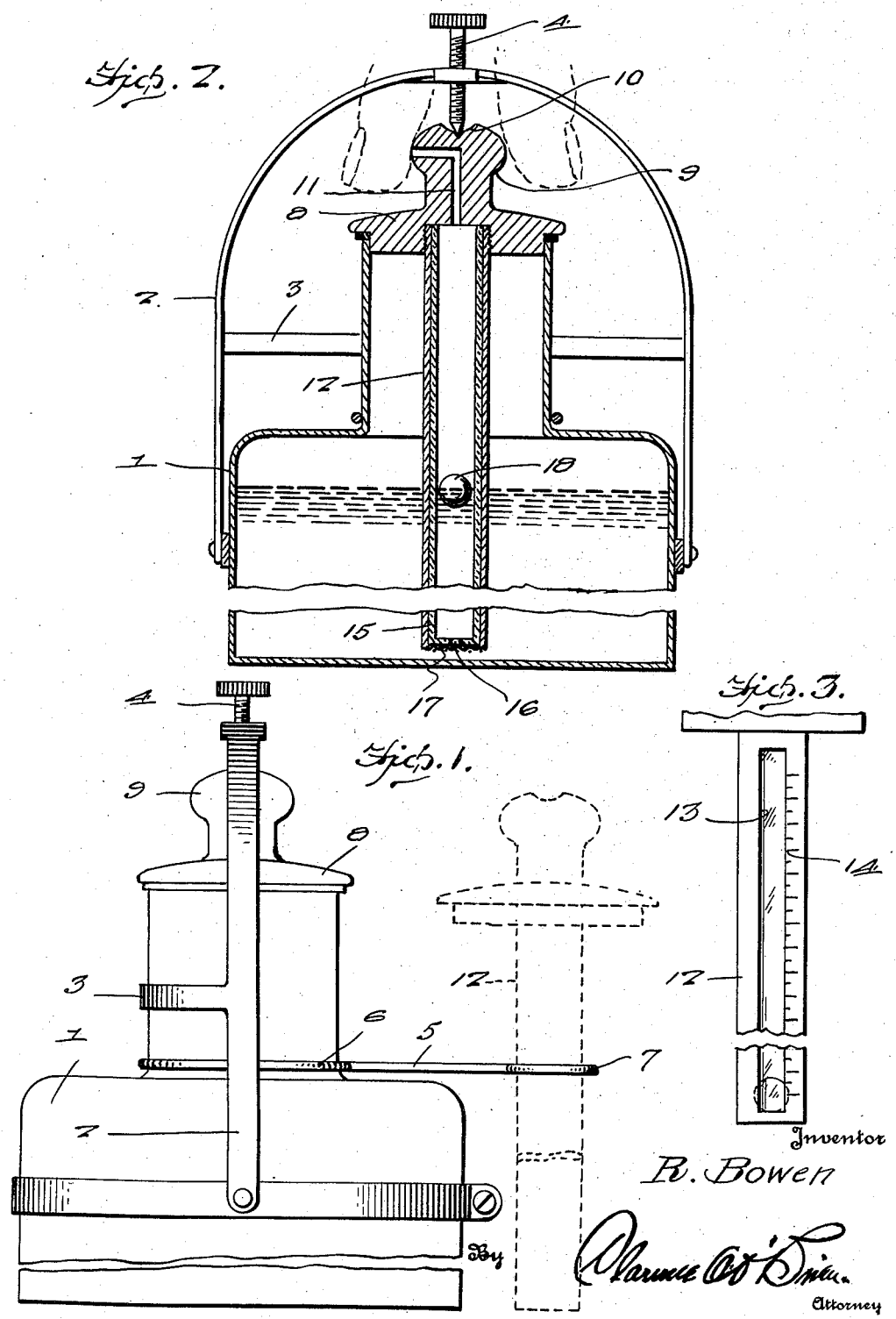

Patented Apr. 20, 1926.

1,581,717

UNITED STATES PATENT OFFICE.

ROY BOWEN, OF HOOPESTON, ILLINOIS.

FILLER CAP AND LIQUID-DEPTH GAUGE.

Application filed December 3, 1924. Serial No. 753,707.

*To all whom it may concern:*

Be it known that I, ROY BOWEN, a citizen of the United States, residing at Hoopeston, in the county of Vermilion and State of Illinois, have invented certain new and useful Improvements in a Filler Cap and Liquid-Depth Gauge, of which the following is a specification.

This invention relates to a combined filler cap and liquid depth gauge, adapted to be applied to receptacles, and it consists in the novel features hereinafter described and claimed.

An object of the invention is to provide a cap and liquid depth gauge of the character stated, which is of simple and durable structure, and which may be readily and quickly applied to the liquid containing receptacle, and removed therefrom, and which may serve to actually indicate the depth of the liquid contained within the receptacle.

In the accompanying drawing:

Figure 1 is a side elevational view of a receptacle with the filler cap and liquid depth gauge applied.

Figure 2 is a transverse sectional view of the same; and

Figure 3 is a fragmentary side elevational view of the filler cap removed from the receptacle.

The receptacle to which the filler cap and liquid depth gauge is applied is indicated at 1, and a bail handle 2 is pivotally connected with the said receptacle in a usual manner. The bail handle 2 is provided with a cross bar 3. A screw 4 is threaded through the upper intermediate portion of the bail handle 2. An arm 5 is provided at one end with a loop 6 extending around the neck of the receptacle 1, and the said arm is provided at its opposite end with a loop 7 adapted to receive the liquid gauge as indicated in dotted lines in Figure 1 of the drawing, and when the said gauge is removed from the receptacle.

The liquid depth gauge comprises a cap 8 which is adapted to normally close the mouth of the receptacle 1, and the said cap is provided with a knob 9 having at its upper end a socket 10 adapted to receive the lower end of the screw 4, when the cap 8 is applied to the mouth of the receptacle and the bail 2 is swung over the upper end of the knob 9. The knob 9 is provided with a conduit 11, the upper end of which opens at the side of the knob and the lower end of which is disposed in alignment with the axis of the knob. A metal tube 12 is connected at its upper end with the center of the cap 8 and the said tube is provided at its side with an opening 13 having a series of graduation marks 14 arranged along one of its vertical side edges. A glass tube 15 is housed within the metal tube 12 and is provided at its lower end with a relatively small opening 16. A screen 17 (best shown in Figure 2 of the drawing) is disposed across the lower end of the tubes 12 and 15. The upper end of the tube 15 communicates with the lower end of the conduit 11. A ball float 18 is loosely received within the tube 15 and is adapted to float upon the surface of the liquid which is contained within the receptacle 1 when the lower ends of the tubes are immersed below the surface of the liquid.

When the cap 8 is used as a closure for the mouth of the receptacle 1, the bail 2 is swung over the upper end of the knob 9 and the screw 4 is moved down so that its lower end engages in the socket 10. Thus the cap 8 is securely held in position upon the mouth of the receptacle. When it is desired to ascertain the depth of the liquid which is contained within the receptacle 1, the screw 4 is withdrawn from the recess 10 and the bail 2 is swung to one side. A finger is then placed over the upper end of the conduit 11, as indicated in Figure 2 of the drawing, and the knob 9 is grasped between the fingers of the hand and the cap 8 is lifted from off the mouth of the receptacle and at the same time the tubes 12 and 15 are withdrawn from the receptacle. In that way the upper end of the conduit 11 is closed by one of the fingers, a certain amount of air will be trapped in the upper portion of the tube 12 and consequently the liquid which is in the lower portion of the tube 15 is withdrawn with the said tube and the ball remains at the surface of the liquid and may be observed through the opening 13 and the depth of the liquid in the receptacle may be ascertained by observing the position of the ball 18 with respect to the graduation marks 14.

As soon as the finger is removed from over the upper end of the conduit 11, air is admitted into the tube 15 and the liquid which is in the lower portion of the tube will gravitate from the same through the opening 16 and the screen 17 and the ball 18 will fall to the lower end of the tube 15.

At such time the tube 12 may be inserted in loop 7, and the closure is thus removed from the mouth of the receptacle and the receptacle may be used for pouring the liquid therefrom.

Having thus described the invention, what I claim is:—

In combination with a receptacle having a bail handle pivotally associated with the receptacle and provided with a cross bar, a screw threaded through the bail handle, a cap having a recess for receiving the end of the screw and provided with a conduit, a transparent tube carried by the cap and communicating at its upper end with the conduit, said tube being provided at its lower end with a restricted opening and a float movably mounted in the tube.

In testimony whereof I affix my signature.

ROY BOWEN.